(12) United States Patent
Liu

(10) Patent No.: US 10,903,971 B2
(45) Date of Patent: Jan. 26, 2021

(54) SYSTEM AND METHOD FOR INDICATING OCCUPATION OF SERVICE RESOURCES VIA AN INDICATION CHANNEL

(71) Applicant: China Academy of Information and Communications Technology, Beijing (CN)

(72) Inventor: Xiaofeng Liu, Beijing (CN)

(73) Assignee: China Academy of Information and Communications Technology, Beijing (CN)

( * ) Notice: Subject to any disclaimer, the term of this patent is extended or adjusted under 35 U.S.C. 154(b) by 0 days.

(21) Appl. No.: 16/559,770

(22) Filed: Sep. 4, 2019

(65) Prior Publication Data

US 2019/0394011 A1 Dec. 26, 2019

Related U.S. Application Data

(63) Continuation of application No. PCT/CN2017/115852, filed on Dec. 13, 2017.

(30) Foreign Application Priority Data

Mar. 17, 2017 (CN) .......................... 2017 1 0159371

(51) Int. Cl.
   *H04L 5/00* (2006.01)

(52) U.S. Cl.
   CPC .......... *H04L 5/0094* (2013.01); *H04L 5/0005* (2013.01); *H04L 5/0042* (2013.01); *H04L 5/0064* (2013.01)

(58) Field of Classification Search
   CPC ... H04L 5/0094; H04L 5/0005; H04L 5/0042; H04L 5/0064; H04L 5/00; H04L 5/0053;
   (Continued)

(56) References Cited

U.S. PATENT DOCUMENTS

2019/0327751 A1* 10/2019 Dong .................... H04L 5/0044
2019/0394781 A1* 12/2019 Liu ....................... H04L 5/0094

FOREIGN PATENT DOCUMENTS

CN    101094216 A    12/2007
CN    105979597 A     9/2016
(Continued)

OTHER PUBLICATIONS

Chinese Office Action for Application No. 201710159371.8 dated Apr. 26, 2019, and an English concise explanation of relevance thereof.

(Continued)

*Primary Examiner* — Ian N Moore
*Assistant Examiner* — Rushil Parimal Sampat
(74) *Attorney, Agent, or Firm* — Harness, Dickey & Pierce, P.L.C.

(57) ABSTRACT

A method and apparatus for indicating occupation of resources through an indication channel, and a storage medium. The method includes, through pre-configuring, a time domain indication and a frequency domain indication for indicating the occupation of the second service resources by the first service through an indication channel. As few K+S bits as possible indicate a position for the transmission of the first service, the duration of the first service, and resource occupation by the first service in the frequency domain. This reduces the impact of the first service on the second service and the overhead of the indication channel for the transmission of the first service while ensuring the transmission of the first service.

15 Claims, 2 Drawing Sheets

(58) Field of Classification Search
CPC .... H04L 5/0058; H04W 72/04; H04W 72/08; H04W 72/042; H04W 72/0453
See application file for complete search history.

(56) References Cited

FOREIGN PATENT DOCUMENTS

| | | |
|---|---|---|
| CN | 106255215 A | 12/2016 |
| CN | 106507439 A | 3/2017 |
| WO | WO-2017034194 A1 | 3/2017 |

OTHER PUBLICATIONS

Samsung "Summary of E-mail Discussions on Multiplexing eMBB and URLLC in DL", R1-1700972, TSG-RAN WG1 NR Ad-hoc Meeting, Jan. 20, 2017 (Jan. 20, 2017).
VIVO "Discussion on DL Multiplexing of eMBB and URLLC", R1-1703392. 3GPP TSG RAN WG1 Meeting #88, Feb. 17, 2017 (Feb. 17, 2017).
International Search Report for International App. No. PCT/CN2017/115852 dated Feb. 26, 2018.

* cited by examiner

| 101 — when transmitting a first service during the transmission of a second service, a gNodeB determines a symbol position for the transmission of the first service in the time domain, wherein the symbol position is closest to the transmission time of the first service among $2^S-1$ possible symbol positions, and determines an occupation state of the frequency domain resources according to the amount of data of the first service.

102 — the gNodeB transmits the information of the indication channel for the first service, which includes: according to the configured time domain indication, determining that S bits are used to represent the symbol position closest to the transmission time of the first service, and determining that K-S bits are used to represent the duration length of the first service; and according to the configured frequency domain indication, determining that T bits are used to represent the occupation state that the frequency domain resources are occupied by the first service 103 — when receiving the information of the indication channel for the first service, the UE parses the contents of the first service according to the time domain indication and the frequency domain indication for indicating the occupation of the second service resources by the first service through the indication channel that are stored locally.

Fig. 1

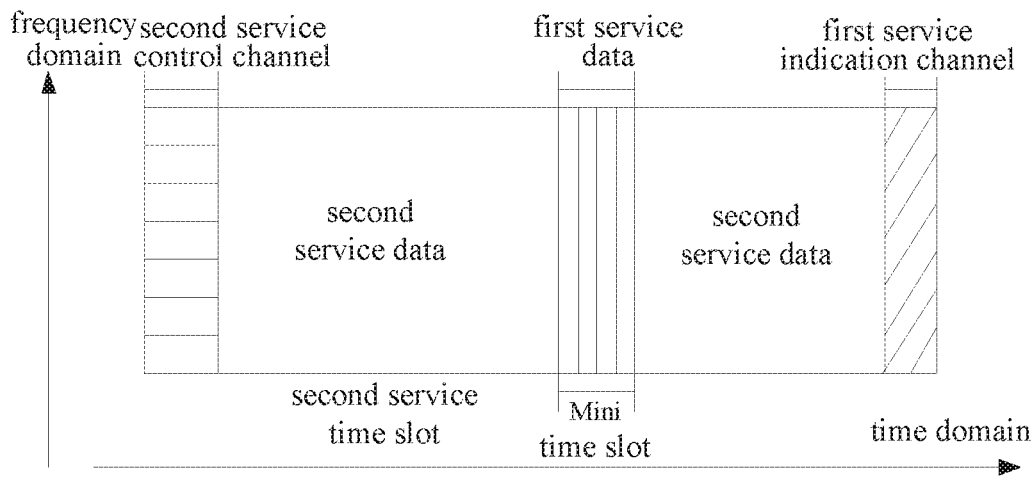

Fig. 2

SYSTEM AND METHOD FOR INDICATING OCCUPATION OF SERVICE RESOURCES VIA AN INDICATION CHANNEL

CROSS-REFERENCE TO RELATED APPLICATIONS

This application is a continuation of International Patent Application No. PCT/CN2017/115852, filed on Dec. 13, 2017. This application claims the benefit and priority of Chinese Patent Application No. 201710159371.8, filed on Mar. 17, 2017. The entire disclosures of each of the above applications are incorporated herein by reference.

FIELD

The present disclosure relates to the field of communication technologies and to indicate the occupation of service resources through an indication channel and a storage medium.

BACKGROUND

This section provides background information related to the present disclosure which is not necessarily prior art.

In future network transmission, in addition to a traditional Enhanced Mobile Broadband (eMBB) service, a large number of other services may be required to be transmitted and supported simultaneously, such as an Ultra Reliable Low Latency Communication (URLLC) service. The URLLC service has special requirements for the delay and reliability of transmission.

To meet the transmission requirements of the URLLC service, an eMBB service under transmission needs to be multiplexed by puncturing to transmit the URLLC service.

When the eMBB service is multiplexed, it is required to indicate a position for the transmission of the URLLC service through an indication channel, which results in the challenge of how to reduce the impact on the eMBB service and the overhead of the indication channel for the transmission of the URLLC service while ensuring the successful transmission of the URLLC service.

SUMMARY

This section provides a general summary of the disclosure, and is not a comprehensive disclosure of its full scope or all of its features.

The embodiments of the present disclosure provide a method and apparatus for indicating the occupation of service resources through an indication channel and a storage medium.

A method for indicating the occupation of service resources through an indication channel includes:

configuring, by a gNodeB, a time domain indication and a frequency domain indication for indicating occupation of second service resources by a first service through an indication channel, wherein, for the time domain indication, S bits indicate that $2^S-1$ possible symbol positions within the second service are allocated to the first service, and K-S bits represent the duration of the first service; for the frequency domain indication, T bits represent $2^T$ occupation states of the second service, and the $i^{th}$ occupation state represents that $\frac{1}{2}^{i-1}$ of the frequency domain resources are occupied. K is the number of bits for the time domain indication, S is an integer larger than 0 and smaller than K, T is the number of bits for the frequency domain indication, and i is an integer larger than 0 and smaller than or equal to $2^T$;

when transmitting the first service during transmission of the second service, determining a symbol position for the transmission of the first service in the time domain, wherein the symbol position is closest to transmission time of the first service among the $2^S-1$ possible symbol positions, and determining an occupation state of the frequency domain resources according to the amount of data of the first service;

transmitting information of the indication channel for the first service, which includes, according to the configured time domain indication, determining that S bits represent the symbol position closest to the transmission time of the first service, and determining that K-S bits represent the duration of the first service and, according to the configured frequency domain indication, determining that T bits represent the occupation state that the frequency domain resources are occupied by the first service; and when receiving the information of the indication channel for the first service, parsing, by a User Equipment (UE), contents of the first service according to a time domain indication and a frequency domain indication for indicating the occupation of the second service resources by the first service through the indication channel that are stored locally.

An apparatus for indicating the occupation of service resources through an indication channel includes:

one or more storages, and
one or more processors; wherein
the one or more storages store one or more instruction modules, configured to be executed by the one or more processors;

the one or more instruction modules comprise:

a configuring unit, configured to configure a time domain indication and a frequency domain indication for indicating occupation of second service resources by a first service through an indication channel, wherein, for the time domain indication, S bits indicate that $2^S-1$ possible symbol positions within the second service are allocated to the first service, and K-S bits represent duration of the first service; for the frequency domain indication, T bits represent $2^T$ occupation states of the second service, and the $i^{th}$ occupation state represents that $\frac{1}{2}^{i-1}$ of the frequency domain resources are occupied. K is the number of bits for the time domain indication, S is an integer larger than 0 and smaller than K, T is the number of bits for the frequency domain indication, and i is an integer larger than 0 and smaller than or equal to $2^T$; and a transmitting unit, configured to, when transmitting the first service during transmission of the second service, determine a symbol position for the transmission of the first service in the time domain, wherein the symbol position is closest to transmission time of the first service among the $2^S-1$ possible symbol positions, and determine an occupation state of the frequency domain resources according to the amount of data of the first service; enable a User Equipment (UE) to, when receiving information of the indication channel for the first service, parse contents of the first service according to a time domain indication and a frequency domain indication for indicating the occupation of the second service resources by the first service through the indication channel that are stored locally; and transmit the information of the indication channel for the first service, which includes, according to the configured time domain indication, determining that S bits represent the symbol position closest to the transmission time of the first service, and determining that K-S bits represent the duration of the first service; and, according to the configured frequency domain indication, determining that T bits represent the occupation state that the frequency domain resources are occupied by the first service.

A non-transitory storage medium storing computer-readable instructions which, when executed by at least one processor, causes the at least one processor to perform the above method.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a flowchart illustrating a method for indicating the occupation of second service resources by a first service through an indication channel according to various embodiments;

FIG. 2 is a diagram illustrating the occupation of second service data by a first service according to various embodiments;

Corresponding reference numerals indicate corresponding parts throughout the several views of the drawings.

DETAILED DESCRIPTION

Figure 3:
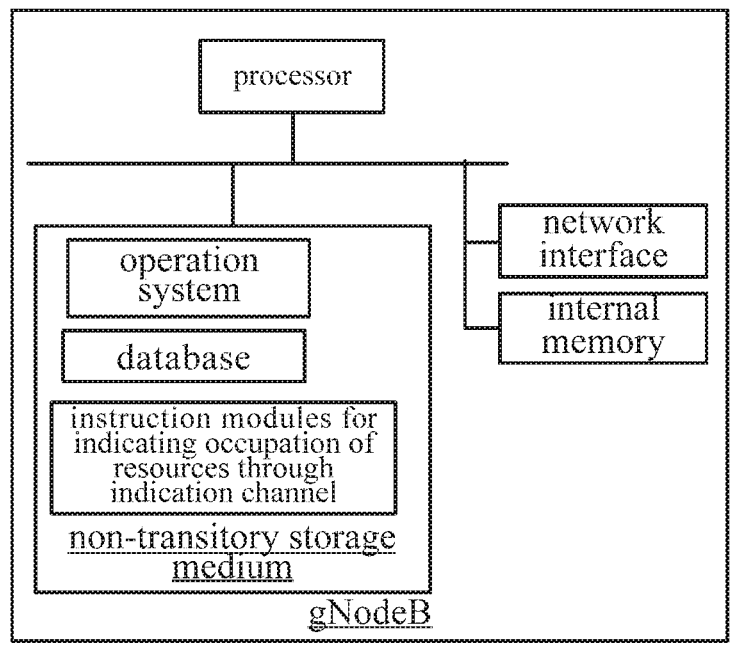
FIG. 3 is a diagram illustrating an internal structure of a gNodeB (or an apparatus for indicating the occupation of resources through an indication channel) according to various embodiments.

Example embodiments will now be described more fully with reference to the accompanying drawings.

In order to make the object, technical solution, and merits of the present application clearer, the present application will be illustrated in detail hereinafter with reference to the accompanying drawings and specific embodiments. The embodiments described herein are merely used to illustrate the present application, but are not used to limit the present application.

Various embodiments of the present disclosure provide a method for indicating the occupation of second service resources by a first service through an indication channel. The method is applied to a system including a gNodeB and a UE (User Equipment). Through pre-configuring a time domain indication and a frequency domain indication for indicating the occupation of the second service resources by the first service through an indication channel, as few K+S bits as possible are used to indicate a position for the transmission of the first service, the duration of the first service, and resource occupation by the first service in the frequency domain. This reduces the impact of the first service on the second service and the overhead of the indication channel for the transmission of the first service while ensuring the transmission of the first service.

In various embodiments, the first service may be a URLLC service and the second service may be an eMBB service.

In various embodiments, the gNodeB pre-configures the time domain indication and the frequency domain indication for indicating the occupation of the second service resources by the first service through the indication channel, which is illustrated as follows.

For the time domain indication, a total of K bits are used for indication. S bits among the K bits indicate that $2^S-1$ possible symbol positions within the second service are allocated to the first service. That is, the S bits represent $2^S$ states. $2^S-1$ states may identify $2^S-1$ symbol positions, and the remaining state may not be used. The S bits among the K bits may be consecutive or inconsecutive. In various embodiments, the first S consecutive bits or the last S consecutive bits of the K bits may be used. K is the number of bits for the time domain indication, and is an integer larger than 0. S is an integer larger than 0 and smaller than K. Hereinafter, various embodiments are provided to illustrate the time domain indication.

A first embodiment is described as follows. When K is equal to 3 and S is equal to 2, three possible symbol positions within the second service are allocated to the first service, which include the $2^{nd}$ symbol, the $4^{th}$ symbol, and the $6^{th}$ symbol. The $2^{nd}$ symbol is represented with 00, the $4^{th}$ symbol is represented with 01, and the $6^{th}$ symbol is represented with 10. According to various embodiments of the present disclosure, the first two consecutive bits of the K bits indicate a symbol starting position, and 11 is not used for indication. In practical applications, any one of the four states may be selected without identifying the symbol position, and the remaining three states may be configured according to habits to indicate the symbol starting position. According to various embodiments of the present disclosure, a possible symbol starting position may be a symbol starting position determined according to practical applications. Another symbol starting position may be determined according to a practical application environment, which is not limited.

A second embodiment is described as follows. When K is equal to 2 and S is equal to 1, one possible symbol position within the second service is allocated to the first service, i.e., the $4^{th}$ symbol, which is represented with 0. In various embodiments, the $4^{th}$ symbol may be represented with 1, and 0 is not used for indication. Various embodiments illustrate two methods for indicating the symbol starting position, and the solution provided by the present disclosure is not limited to the two embodiments.

The duration of the first service is represented with K–S bits. When K is equal to 3 and S is equal to 2, or K is equal to 2 and S is equal to 1, the duration of the first service is represented with 1 bit. For example, 0 is used to represent that the duration is 1, and 1 is used to represent that the duration is 2, and vice versa.

For the frequency domain indication, T bits represent $2^T$ occupation states of the second service, and the $i^{th}$ occupation state represents that $\frac{1}{2}^{i-1}$ of the frequency domain resources are occupied. T is the number of bits for the frequency domain indication, and i is an integer larger than 0 and smaller than or equal to $2^T$. T may be equal to 1 or 2. When T is equal to 1, there are two occupation states of the second service. The following two occupation states of the second service are represented with 0 and 1, respectively. The two occupation states include an occupation state that all of the frequency domain resources are occupied and an occupation state that ½ of the frequency domain resources are occupied. It is not limited herein that 0 is used to represent the occupation state that all of the frequency domain resources are occupied or that 1 is used to represent the occupation state that ½ of the frequency domain resources are occupied.

When T is equal to 2, there are four occupation states of the second service. The four occupation states include an occupation state that all of the frequency domain resources are occupied; an occupation state that ½ of the frequency domain resources are occupied; an occupation state that ¼ of the frequency domain resources are occupied; and an occupation state that ⅛ of the frequency domain resources are occupied, which are represented with 00, 01, 10, and 11, respectively. It is not limited herein which bit is used to represent which frequency domain resources are occupied. When T is equal to 2, it is more suitable for a case that a single user occupies a particularly large system bandwidth.

The occupation of ½ of the frequency domain resources indicates that half of a minimum available frequency domain scheduling unit of a current user is occupied. N available frequency domain scheduling units of the current user being occupied indicates that the first service occupies N/2 scheduling units starting from the beginning of the frequency domain, where N is an even number. N being an odd number indicates that the first service occupies N/2−1 scheduling units starting from the beginning of the frequency domain. When T is equal to 2, the occupation state that all of the frequency domain resources are occupied and the occupation state that ½ of the frequency domain resources are occupied are both the same as those when T is equal to 1. For the occupation state that ¼ of the frequency domain resources are occupied and the occupation state that ⅛ of the frequency domain resources are occupied, the occupied resources are, respectively, ¼ and ⅛ of the minimum available frequency domain scheduling unit of the current user. If the value of N/2, N/4 or N/8 is not an integer, the value of N/2, N/4 or N/8 is rounded down. The occupation position of frequency domain resources is determined according to a system default frequency scheduling order. For example, if the system default frequency scheduling order is from high frequency to low frequency, the occupation position is from high frequency to low frequency, and vice versa.

In various embodiments, a UE may locally configure and store the time domain indication and the frequency domain indication for indicating the occupation of the second service resources by the first service through the indication channel, which are both the same as those configured by the gNodeB. The time domain indication and the frequency domain indication may also be configured by the gNodeB, then the gNodeB transmits the time domain indication and the frequency domain indication to the UE, and the UE stores them locally to receive the first service.

A process of indicating the occupation of the second service resources by the first service through the indication channel will be described in detail according to various embodiments of the present disclosure.

FIG. 1 is a flowchart illustrating a method for indicating the occupation of second service resources by a first service through an indication channel according to various embodiments of the present disclosure. The method includes the following blocks.

Block 101: When transmitting a first service during the transmission of a second service, a gNodeB determines a symbol position for the transmission of the first service in the time domain, wherein the symbol position is closest to the transmission time of the first service among $2^S-1$ possible symbol positions, and determines an occupation state of the frequency domain resources according to the amount of data of the first service.

Block 102: The gNodeB transmits the information of the indication channel for the first service, which includes, according to the configured time domain indication, determining that S bits represent the symbol position closest to the transmission time of the first service, and determining that K−S bits represent the duration of the first service. According to the configured frequency domain indication, determining that T bits represent the occupation state that the frequency domain resources are occupied by the first service.

Block 103: When receiving the information of the indication channel for the first service, the UE parses the contents of the first service according to the time domain indication and the frequency domain indication for indicating the occupation of the second service resources by the first service through the indication channel that are stored locally.

Because the time domain indication information and the frequency domain indication information for the URLCC service can be determined accurately, it can be determined which second service resources are occupied by the first service, thereby accurately demodulating the second service.

A detailed channel indication method is described as follows. For example, K is set to 3, S is set to 2, and T is set to 1. The first two consecutive bits of 3 bits identify a symbol starting position. Particularly, 00 represents that the starting position is the $2^{nd}$ symbol, 01 represents that the starting position is the $4^{th}$ symbol, 10 represents that the starting position is the $6^{th}$ symbol, and 11 is not used for indication. The last bit of the 3 bits is used to represent the duration of the URLCC service. 0 represents that the duration is 1, and 1 represents that the duration is 2. The occupation states of resources are represented with 1 bit, 0 represents that all of the frequency domain resources are occupied, and 1 represents that ½ of the frequency domain resources are occupied.

If it is necessary for the gNodeB to transmit the URLCC service during the transmission of the second service and the second service is starting at the $3^{rd}$ symbol, the gNodeB selects the $4^{th}$ symbol closest to the $3^{rd}$ symbol as a transmission starting position of the URLCC service and 01 indicates the transmission starting position. If the first service needs two consecutive symbols, the $4^{th}$ and $5^{th}$ symbols are occupied, which are represented with 1. In the frequency domain, 0 represents that all of the frequency domain resources are occupied. Channel indication for the first service is indicated by 0110.

When receiving the information of the channel indication, the UE can learn from 0110 according to the locally stored related indication information that the first service begins to be transmitted from the $4^{th}$ symbol and continues until the $5^{th}$ symbol. Accordingly, the first service is transmitted through occupying all of the frequency domain resources.

According to various embodiments of the present disclosure, the channel indication can be implemented using K+T bits. According to practical applications, the value of K+T can be made as small as possible to reduce the overhead of channel indication. During the transmission of the channel indication, the transmission mode of the K+T bits, for example, a modulation encoding mode, and specific position are not limited, and the K+T bits may be transmitted on any symbol of the second service after the first service is transmitted.

FIG. 2 is a diagram illustrating the occupation of second service data by a first service according to various embodiments of the present disclosure. In FIG. 2, a second service is transmitted using a longer second service time slot, and the first service is transmitted by a Mini time slot. Since the first service occupies the transmission of the second service, an indication channel for the first service is introduced to ensure the accurate modulation of the second service, and the transmission location of the information of the indication channel is the last symbol of the second service.

According to various embodiments of the present disclosure, through pre-configuring the time domain indication and the frequency domain indication for indicating the occupation of the second service resources by the first service through the indication channel, as few K+S bits as possible are used to indicate the position for the transmission of the first service, the duration of the first service, and resource occupation by the first service in the frequency domain. This reduces the impact of the first service on the second service and the overhead of the indication channel for the transmission of the first service while ensuring the transmission of the first service.

FIG. 3 is a diagram illustrating an internal structure of a gNodeB (or an apparatus for indicating the occupation of resources through an indication channel) according to various embodiments. As shown in FIG. 3, the gNodeB includes a processor, a non-transitory storage medium, an internal memory, and a network interface, which are connected with each other by a system bus. The non-transitory storage medium of the gNodeB stores an operation system and a database and instruction modules in the apparatus for indicating the occupation of resources through the indication channel, i.e., instruction modules for carrying out the method for indicating the occupation of resources through an indication channel. The database may include a frequency domain information database, time domain information database, and a database for the occupation of the second service resources by the first service. The instruction modules in the apparatus for indicating the occupation of resources through the indication channel may implement the method for indicating the occupation of resources through the indication channel, wherein the method is applicable to the gNodeB. The processor of the gNodeB may provide a computing and controlling capability to support the running of the gNodeB. The internal memory of the gNodeB may provide a running environment for the instruction modules in the apparatus for indicating the occupation of resources through the indication channel, wherein the instruction modules are stored in the non-transitory storage medium. The internal memory may store computer-readable instructions which, when executed by the processor, cause the processor to perform the method for indicating the occupation of resources through the indication channel. The network interface of the gNodeB may be used to communicate with an external UE, for example, via the gNodeB, which may transmit the first service and the second service to the external UE and may indicate the transmission position. The gNodeB may be implemented using, separately, gNodeB or a gNodeB group composed of multiple gNodeBs. Those skilled in the art will understand that the structure shown in FIG. 3 is only a part of the structure related to the solution of the present disclosure, and is not used to limit the gNodeB to which the solution of the present disclosure is applied. According to various embodiments, the gNodeB may include more or fewer components than those shown in the figures, or some components may be combined, or the components may be arranged with different modes.

Figure 4:
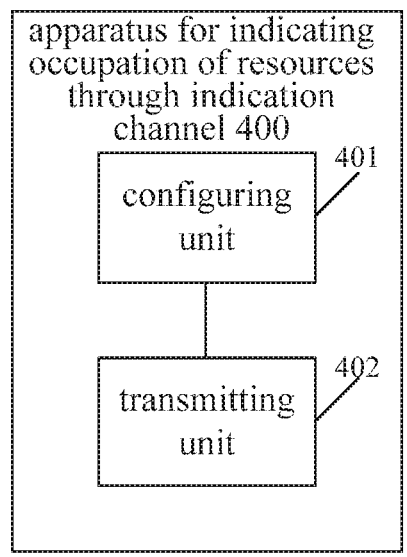
FIG. 4 is a diagram illustrating an apparatus 400 for indicating the occupation of resources through an indication channel according to various embodiments.

FIG. 4 is a diagram illustrating an apparatus 400 for indicating the occupation of resources through an indication channel (for example, a gNodeB) according to various embodiments. The apparatus 400 for indicating the occupation of resources through an indication channel includes: one or more storages (for example, the non-transitory storage medium shown in FIG. 3), and one or more processors; wherein the one or more storages store one or more instruction modules, configured to be executed by the one or more processors.

In FIG. 4, the one or more instruction modules include the following units. A configuring unit 401 is configured to configure a time domain indication and a frequency domain indication for indicating the occupation of second service resources by a first service through an indication channel. For the time domain indication, S bits indicate that $2^S-1$ possible symbol positions within the second service are allocated to the first service, and K−S bits represent the duration of the first service. For the frequency domain indication, T bits represent $2^T$ occupation states of the second service, and the $i^{th}$ occupation state represents that $\frac{1}{2}^{i-1}$ of the frequency domain resources are occupied. K is the number of bits for the time domain indication, S is an integer larger than 0 and smaller than K, T is the number of bits for the frequency domain indication, and i is an integer larger than 0 and smaller than or equal to $2^T$.

A transmitting unit 402 is configured to, when transmitting the first service during transmission of the second service, determine a symbol position for the transmission of the first service in the time domain, wherein the symbol position is closest to transmission time of the first service among the $2^S-1$ possible symbol positions, and determine an occupation state of the frequency domain resources according to the amount of data of the first service; enable a User Equipment (UE) to, when receiving information of the indication channel for the first service, parse contents of the first service according to a time domain indication and a frequency domain indication for indicating the occupation of the second service resources by the first service through the indication channel that are stored locally; and transmit the information of the indication channel for the first service, which includes: according to the configured time domain indication, determining that S bits represent the symbol position closest to the transmission time of the first service, and determining that K−S bits represent the duration of the first service; and according to the configured frequency domain indication, determining that T bits represent the occupation state that the frequency domain resources are occupied by the first service. S represents the first S consecutive bits or the last S consecutive bits of K bits.

According to various embodiments, when K is equal to 3 and S is equal to 2, three possible symbol positions within the second service are allocated to the first service, which include the $2^{nd}$ symbol, the $4^{th}$ symbol, and the $6^{th}$ symbol. The $2^{nd}$ symbol is represented with 00, the $4^{th}$ symbol is represented with 01, and the $6^{th}$ symbol is represented with 10. According to various embodiments, when K is equal to 2 and S is equal to 1, one possible symbol position within the second service is allocated to the first service, i.e., the $4^{th}$ symbol, which is represented with 0.

According to various embodiments, when T is equal to 1, there are two occupation states of the second service. The two occupation states include an occupation state that all of the frequency domain resources are occupied and an occupation state that ½ of the frequency domain resources are occupied, which are represented with 0 and 1, respectively. According to various embodiments, when T is equal to 2 there are four occupation states of the second service. The four occupation states include an occupation state that all of the frequency domain resources are occupied, an occupation state that ½ of the frequency domain resources are occupied, an occupation state that ¼ of the frequency domain resources are occupied, and an occupation state that ⅛ of the frequency domain resources are occupied, which are represented with 00, 01, 10, and 11, respectively.

Those skilled in the art will understand that all or part of the procedures in the various embodiments can be implemented by instructing related hardware by a program. The program may be stored in a non-transitory computer-readable storage medium and, when executed, includes the above methods. The storage medium may be a disk, a Compact Disc (CD), a Read-Only Memory (ROM), etc.

Various embodiments of the present disclosure also provide a non-transitory storage medium. The non-transitory storage medium stores computer-readable instructions, which may cause at least one processor to perform the above methods.

The technical features of the above embodiments may be arbitrarily combined. For the sake of simplicity, not all possible combinations of the technical features in the above embodiments are described. However, as long as there is no contradiction in the combination of these technical features, it should be considered within the scope of the specification.

The foregoing is several embodiments of the present application, and the protection scope of the present application is not limited to this. It should be noted that any modification and improvement which can be made by those skilled in the art within the principle of the present application should be covered in the protection scope of the present disclosure. And thus, the protection scope of the present application should be defined by the claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for indicating occupation of service resources through an indication channel, comprising:

configuring, by a gNodeB, a time domain indication and a frequency domain indication for indicating occupation of a second service by a first service through an indication channel, wherein, for the time domain indication, S bits indicate that $2^S-1$ possible symbol positions within the second service are allocated to the first service, and K−S bits represent duration of the first service; for the frequency domain indication, T bits represent $2^T$ occupation states of the second service, and the $i^{th}$ occupation state represents that $\frac{1}{2}^{i-1}$ of frequency domain resources are occupied, K is the number of bits for the time domain indication, S is an integer larger than 0 and smaller than K, T is the number of bits for the frequency domain indication, and i is an integer larger than 0 and smaller than or equal to $2^T$;

when transmitting the first service during transmission of the second service, determining a symbol position for the transmission of the first service in the time domain, wherein the symbol position is closest to transmission time of the first service among the $2^S-1$ possible symbol positions, and determining an occupation state of the frequency domain resources according to an amount of data of the first service;

transmitting information of the indication channel for the first service, which includes: according to the configured time domain indication, determining that S bits represent the symbol position closest to the transmission time of the first service, and determining that K−S bits represent the duration of the first service, and according to the configured frequency domain indication, determining that T bits represent the occupation state that the frequency domain resources are occupied by the first service; and when receiving the information of the indication channel for the first service, parsing, by a User Equipment (UE), contents of the first service according to the time domain indication and the frequency domain indication for indicating the occupation of the second service by the first service through the indication channel that are stored locally, wherein when T is equal to 2, there are four occupation states of the second service, and the four occupation states of the second service comprise an occupation state that all of the frequency domain resources are occupied, an occupation state that ½ of the frequency domain resources are occupied, an occupation state that ¼ of the frequency domain resources are occupied and an occupation state that ⅛ of the frequency domain resources are occupied, and are represented with 00, 01, 10 and 11 respectively.

2. The method of claim 1, wherein S represents the first S consecutive bits or the last S consecutive bits of K bits.

3. The method of claim 1, wherein when K is equal to 3 and S is equal to 2, three possible symbol positions within the second service is allocated to the first service; wherein the three symbol positions comprise the $2^{nd}$ symbol, the $4^{th}$ symbol and the $6^{th}$ symbol, the $2^{nd}$ symbol is represented with 00, the $4^{th}$ symbol is represented with 01 and the $6^{th}$ symbol is represented with 10.

4. The method of claim 1, wherein when K is equal to 2 and S is equal to 1, one possible symbol position within the second service is allocated to the first service; wherein the symbol position is the $4^{th}$ symbol, and the $4^{th}$ symbol is represented with 0.

5. The method of claim 1, wherein when T is equal to 1, there are two occupation states of the second service, and the two occupation states of the second service comprise an occupation state that all of the frequency domain resources are occupied and an occupation state that ½ of the frequency domain resources are occupied, and are represented with 0 and 1 respectively.

6. The method of claim 1, wherein a occupation position of frequency domain resources is determined according to a system default frequency scheduling order.

7. The method of claim 1, wherein the time domain indication and the frequency domain indication for indicating the occupation of the second service by the first service through the indication channel are configured and stored locally by the UE, or is received from the gNodeB and is stored by the UE.

8. An apparatus for indicating occupation of resources through an indication channel, comprising:
one or more storages, and
one or more processors; wherein
the one or more storages store one or more instruction modules, configured to be executed by the one or more processors; and
the one or more instruction modules comprise:
a configuring unit, configured to configure a time domain indication and a frequency domain indication for indicating occupation of a second service by a first service through an indication channel, wherein, for the time domain indication, S bits indicate that $2^S-1$ possible symbol positions within the second service are allocated to the first service, and K−S bits represent duration of the first service; for the frequency domain indication, T bits represent $2^T$ occupation states of the second service, and the $i^{th}$ occupation state represents that $½^{11}$ of frequency domain resources are occupied; K is the number of bits for the time domain indication, S is an integer larger than 0 and smaller than K, T is the number of bits for the frequency domain indication, and i is an integer larger than 0 and smaller than or equal to $2^T$; and
a transmitting unit, configured to, when transmitting the first service during transmission of the second service, determine a symbol position for the transmission of the first service in the time domain, wherein the symbol position is closest to transmission time of the first service among the $2^S-1$ possible symbol positions, and determine an occupation state of the frequency domain resources according to an amount of data of the first service; transmit the information of the indication channel for the first service, which includes: according to the configured time domain indication, determining that S bits represent the symbol position closest to the transmission time of the first service, and determining that K−S bits represent the duration of the first service; and according to the configured frequency domain indication, determining that T bits represent the occupation state that the frequency domain resources are occupied by the first service; enable a User Equipment (UE) to, when receiving information of the indication channel for the first service, parse contents of the first service according to the time domain indication and the frequency domain indication for indicating the occupation of the second service by the first service through the indication channel that are stored locally,
wherein when T is equal to 2, there are four occupation states of the second service, and the four occupation states of the second service comprise an occupation state that all of the frequency domain resources are occupied, an occupation state that ½ of the frequency domain resources are occupied, an occupation state that ¼ of the frequency domain resources are occupied and an occupation state that ⅛ of the frequency domain resources are occupied, and are represented with 00, 01, 10 and 11 respectively.

9. The apparatus of claim 8, wherein S represents the first S consecutive bits or the last S consecutive bits of K bits.

10. The apparatus of claim 8, wherein when K is equal to 3 and S is equal to 2, three possible symbol positions within the second service are allocated to the first service; wherein the three symbol positions comprise the $2^{nd}$ symbol, the $4^{th}$ symbol and the 6th symbol, the $2^{nd}$ symbol is represented with 00, the $4^{th}$ symbol is represented with 01 and the $6^{th}$ symbol is represented with 10.

11. The apparatus of claim 8, wherein when K is equal to 2 and S is equal to 1, one possible symbol position within the second service is allocated to the first service; wherein the symbol position is the $4^{th}$ symbol, and the $4^{th}$ symbol is represented with 0.

12. The apparatus of claim 8, wherein when T is equal to 1, there are two occupation states of the second service, and the two occupation states of the second service comprise an occupation state that all of the frequency domain resources are occupied and an occupation state that ½ of the frequency domain resources are occupied and are represented with 0 and 1 respectively.

13. The apparatus of claim 8, wherein a occupation position of frequency domain resources is determined according to a system default frequency scheduling order.

14. The apparatus of claim 8, wherein the time domain indication and the frequency domain indication for indicating the occupation of the second service resources by the first service through the indication channel are configured and stored locally by the UE, or is received from a gNodeB and is stored by the UE.

15. A non-transitory storage medium storing computer-readable instructions which, when executed by at least one processor, causes the at least one processor to perform the method claimed by any of claims 1-5 or 6-7.

* * * * *